Sept. 22, 1959　　　　　E. MIHALEK　　　　　2,905,360
MACHINE FOR VENDING CARTONS OR OTHER ARTICLES
Filed Feb. 10, 1955　　　　　　　　　　　　8 Sheets-Sheet 1

INVENTOR
EMERY MIHALEK

Ooms, McDougall, Williams & Hersh
ATTYS.

Sept. 22, 1959    E. MIHALEK    2,905,360
MACHINE FOR VENDING CARTONS OR OTHER ARTICLES
Filed Feb. 10, 1955    8 Sheets-Sheet 2

Inventor
EMERY MIHALEK
Ooms, McDougall, Williams & Hersh
Attys.

Sept. 22, 1959  E. MIHALEK  2,905,360
MACHINE FOR VENDING CARTONS OR OTHER ARTICLES
Filed Feb. 10, 1955  8 Sheets-Sheet 3

Inventor
EMERY MIHALEK
Ooms, McDougall, Williams & Hersh
Attys.

Sept. 22, 1959 E. MIHALEK 2,905,360
MACHINE FOR VENDING CARTONS OR OTHER ARTICLES
Filed Feb. 10, 1955 8 Sheets-Sheet 4

Fig. 8  Fig. 9

Inventor
EMERY MIHALEK
Ooms, McDougall, Williams & Hersh
Attys.

Sept. 22, 1959     E. MIHALEK     2,905,360
MACHINE FOR VENDING CARTONS OR OTHER ARTICLES
Filed Feb. 10, 1955     8 Sheets-Sheet 7

Inventor
EMERY MIHALEK
Ooms, McDougall, Williams & Hersh
Attys.

Sept. 22, 1959          E. MIHALEK          2,905,360

MACHINE FOR VENDING CARTONS OR OTHER ARTICLES

Filed Feb. 10, 1955

Inventor

EMERY MIHALEK

Ooms, McDougall, Williams & Hersh

Attys.

United States Patent Office 2,905,360
Patented Sept. 22, 1959

1

2,905,360

MACHINE FOR VENDING CARTONS OR OTHER ARTICLES

Emery Mihalek, Chicago, Ill., assignor to Hershey Mfg. Co., Chicago, Ill., a corporation of Illinois Application February 10, 1955, Serial No. 487,307

7 Claims. (Cl. 221—9)

This invention relates to vending machines and particularly to a new and improved machine adapted to vend paper milk cartons or other articles. Such cartons are often referred to as "bottles" in the trade, and will sometimes be so designated herein.

One principal object of the invention is to provide a new and improved vending machine whereby the cartons, bottles or other articles are held in rows in a plurality of carriers which are advanced successively to a delivery position, whereupon the row of cartons in each carrier is advanced longitudinally to deliver the successive cartons in the row from the carrier.

A further object of the invention is to provide an improved vending machine in which the movement of the cartons or other articles is so controlled that there is no possibility that a carton may become jammed in the machine.

It is another object of the present invention to provide an improved vending machine which will hold a great number of cartons or other articles, will deliver the individual cartons efficiently and quickly, and will require very little operating power.

A further object of the invention is to provide a vending machine in which the vending mechanism is mounted on a frame which may be rolled out of the cabinet of the machine on guide rails so as to facilitate filling, cleaning, maintenance, and servicing of the machine.

Another object is to provide an improved vending machine in which the spilled contents of any defective carton will be drained away into a suitable receptacle so that the machine may easily be kept clean and sanitary.

Further objects and advantages will appear from the following description, taken with the accompanying drawings, in which:

2

Fig. 10b constitutes a continuation of the upper part of Fig. 10a;

Fig. 15 is an enlarged fragmentary side elevational view showing the carton carrier at the delivery position, the view being taken generally as indicated by the line 15—15 in Fig. 10a;

Figure 1:
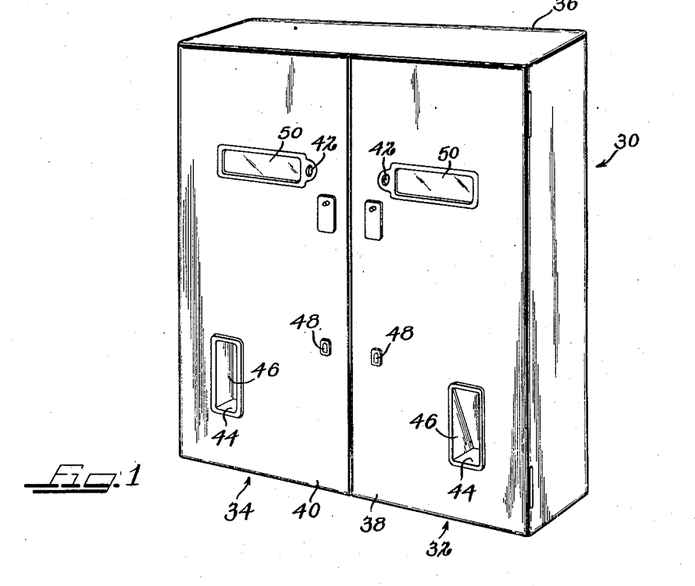
Figure 1 is a perspective view of an exemplary milk carton vending machine constituting an illustrative embodiment of the invention.

If the drawings are considered in greater detail, it will be seen that they illustrate an exemplary vending machine 30, shown as a whole in Fig. 1. The illustrated machine is actually two machines in one, in that it embodies duplicate right and left hand vending units 32 and 34. Accordingly, only the right hand unit 32 will be described in detail.

It will be seen from Fig. 1 that the vending machine 30 is housed in a cabinet 36 having a pair of outer front doors 38 and 40 adapted to swing forwardly to gain access to the interior of the machine. Each of the vending units 32 and 34 is operated simply by depositing a suitable coin or coins in a coin receiving opening 42 provided in the corresponding front door 38 or 40, whereupon a milk filled carton or other article is promptly delivered onto a platform 44 formed in a recessed delivery opening 46. The machine may be arranged to return change through a coin return opening 48. For example, the machine may be arranged to return a nickel in change when a quarter is deposited in the coin receiving opening 42. When the machine is empty, the quarter will be returned through the coin return opening 48. The machine is ordinarily arranged so that a carton of milk will be delivered if four nickels are deposited in the coin opening 42. It will be realized that the coin handling mechanism may be varied so that any other desired combination of coins will operate the machine. However, the coin handling and change making mechanisms need not be described in further detail since they form no part of the present invention. A window 50 may be provided in each of the cabinet doors 38 and 40 to display various signal lights and illuminated legends, as will appear in greater detail below.

Figure 3:
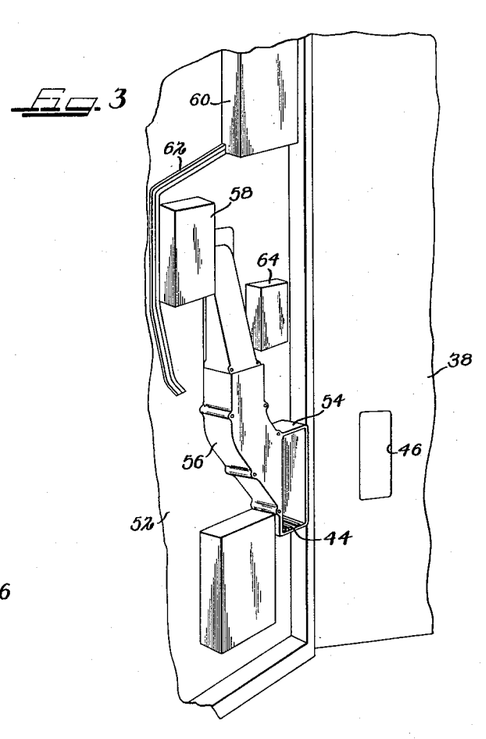
Fig. 3 is a fragmentary perspective view of the vending machine with the outer front door of the machine open.
Figure 4:
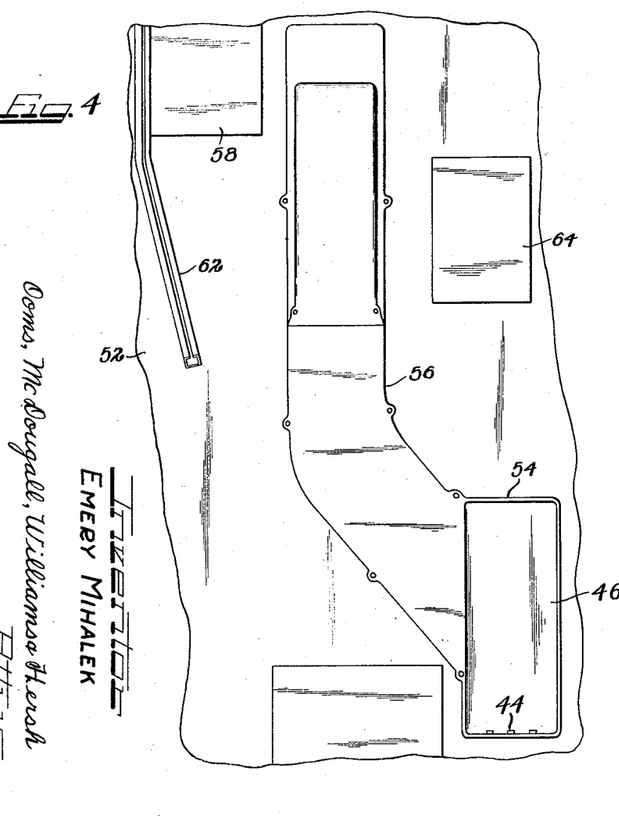
Fig. 4 is a fragmentary front elevational view of the inner door on the vending machine, the view showing the chute through which cartons or other articles are delivered.

Opening the right hand front door 38 of the cabinet 36 reveals an inner door 52 which carries the platform 44 onto which the cartons or other articles are delivered, for removal from the machine by the customer through the opening 46 in the outer door 38. The platform 44 forms the lower wall of a generally rectangular box-like receptacle 54 communicating with the lower end of a delivery chute 56 mounted on the inner door 52. As will appear in greater detail below, each successive carton vended by the machine descends by gravity through the chute 56 and comes to rest on the platform 44.

Also mounted on the inner door 52 is a coin selecting mechanism 58 for receiving coins from the coin opening 42. The inner door 52 also supports a change making mechanism 60 provided with a coin chute 62 having its lower end communicating with the coin return opening 48. A stepper or accumulator 64 may be provided so that the machine will operate on a combination of small coins.

Figure 5:
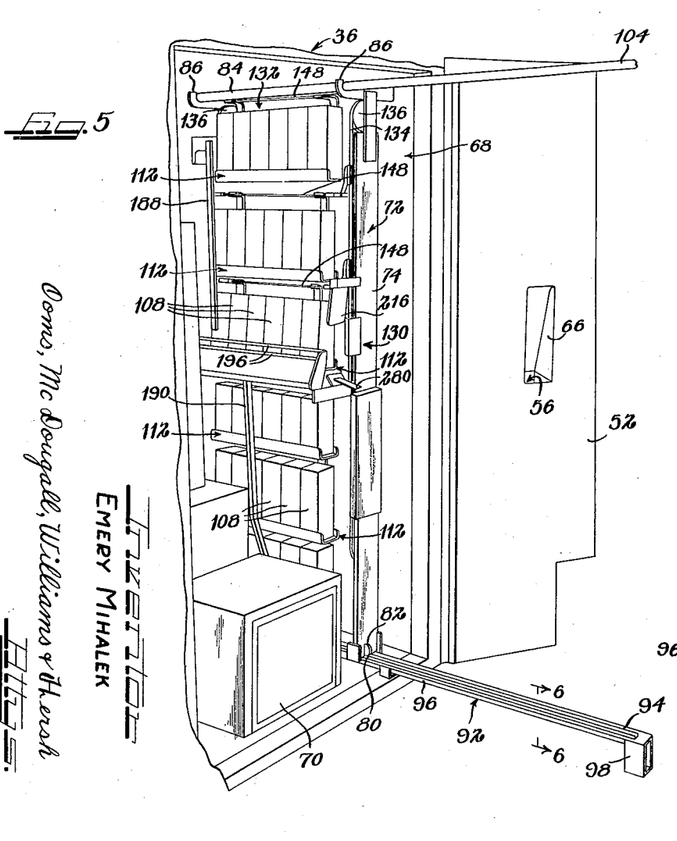
Fig. 5 is a fragmentary perspective view showing the vending machine with both the inner and outer doors open and with an extension rail member and an extension guide member in place on the machine to permit the vending mechanism to be rolled out of the cabinet.

In Fig. 5, the inner door 52 is shown in open position. An opening 66, communicating with the head of the delivery chute 56, is thereby revealed. Inside the cabinet 36 a vending mechanism 68 is provided to deliver cartons one at a time to the opening 66. In order that the cartons may be stored under refrigeration, a cooling unit 70 is mounted inside the cabinet 36.

The illustrated vending mechanism 68 comprises a supporting frame 72. In its illustrated form, the frame 72 includes front and rear uprights 74 and 76 arranged in parallel spaced relation. A plurality of vertically spaced horizontal members 78 extend between and are rigidly secured to the uprights 74 and 76.

In order to facilitate filling, cleaning, and servicing of the vending mechanism 68, provision is made for movably supporting the frame 72 so that the entire vending mechanism 68 may be moved out of the cabinet 36. To this end, the lower end of the frame 72 is supported on a fixed channel-shaped rail 80 mounted on the cabinet 36. A roller 82 is rotatably mounted on the lower end of each of the uprights 74 and 76 to ride in the rail 80. At the upper end of the vending mechanism 68, the frame 72 is supported by an additional guide member or rail 84 which may be in the form of a rod or tube, preferably the latter. The guide member 84 is engaged by a pair of shoes 86 mounted on the upper ends of the uprights 74 and 76. It will be seen from Figs. 5 and 8 that each shoe 86 is in the form of a bar having an upwardly opening notch or slot 88 for receiving the guide member 84. An adjustable retainer element 90 is provided to adjust the width of the notch 88.

Figure 6:
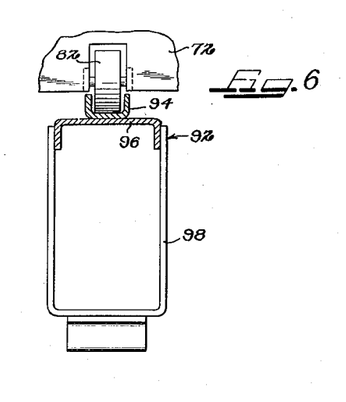
Fig. 6 is a fragmentary elevational sectional view taken through the extension rail member, generally along a line 6—6 in Fig. 5.
Figure 7:
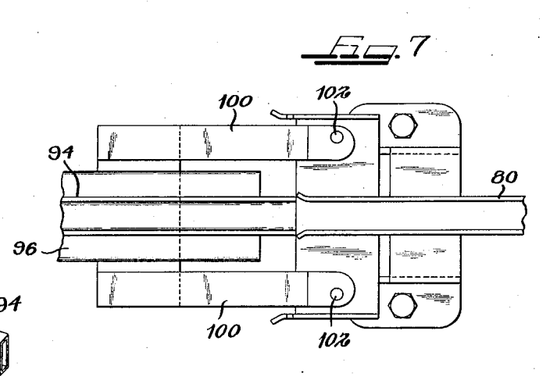
Fig. 7 is a fragmentary enlarged plan view showing the connection between the extension rail member and the fixed rail section mounted in the cabinet of the machine.

The frame 72 of the vending mechanism 68 may be supported outside the cabinet 36 by attaching an extension rail member 92 to the front end of the fixed rail 80. As shown in Figs. 5–7, the extension rail member 92 includes a roller receiving channel 94 mounted on a supporting member 96. A leg 98 may be mounted on the outer end of the supporting member 96 to maintain the extension rail 92 at the proper elevation. Fingers 100 having locking pins 102 may be utilized to connect the extension rail member 92 to the cabinet 36 in alinement with the fixed rail 80.

Figure 14:
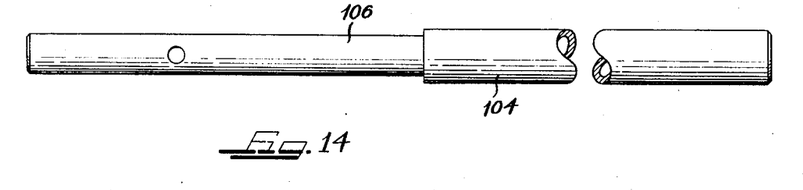
Fig. 14 is a longitudinal view of the extension guide member of Fig. 5.

At the upper end of the frame 72, the guide member 84 may be extended forwardly by means of an extension guide member 104. As clearly shown in Figs. 5 and 14, the extension guide member 104 may be tubular in form and may be provided with a reduced inner end portion 106 adapted to be telescopically received in the fixed guide member 84. With the rail extension 92 and the guide extension 104 in place, the frame 72 may readily be rolled out of the cabinet 36 so as to be easily accessible for filling, cleaning, and maintenance.

The illustrated vending mechanism 68 is set up to vend paper milk cartons or bottles 108 of the conventional type. Each carton 108 has a square bottom and rectangular side walls. The illustrated cartons have square, flat tops, but the machine will vend cartons having gable or other type tops without a change or adjustment in the machine. It will be understood that the vending mechanism will handle a wide variety of articles with only minor variations and adjustments, which may readily be made by those skilled in the art.

Figure 12:
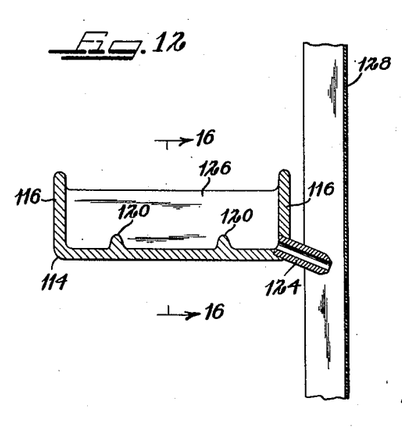
Fig. 12 is a fragmentary elevational sectional view showing the arrangement for collecting and draining off the spilled contents of any defective carton.

The cartons 108 are carried in the machine in an upright position and in a plurality of groups. In each of the groups the cartons are arranged in a row with the adjacent cartons in abutting relation. In order that the cartons may be thus held in independent rows, the several groups of cartons are supported in a plurality of carton carriers 112. As shown to advantage in Figs. 5, 10a, and 15, each carton carrier 112 includes an elongated carton supporting channel 114, or other member adapted to hold the cartons in a row. Each channel has upwardly directed side flanges 116 adapted to guide the side walls of the cartons 108. A bottom wall 118 extends between the side flanges 116. Two or more ridges 120 extend along the bottom wall 118 to support the lower ends of the cartons 108. It will be evident that any milk spilled from any defective carton will be caught by the channel 114. To drain the milk from the channel, the bottom wall 118 is provided with an upper surface 122 which slopes in one direction so as to carry the spilled milk to a spout 124 (Fig. 12) fitted into one end of the channel. Adjacent the spout 124, the channel-shaped carton supporting member 114 is formed with a transverse fluid retaining wall 126 so that all of the milk will be discharged through the spout. One or more channel-shaped vertical conduits 128 may be provided to receive the spouts 124 of the various carton carriers and thereby direct any spilled milk downwardly into a suitable receptacle (not shown).

In the illustrated machine the carton carriers 112 are successively indexed to a delivery position 130 (Fig. 5). To this end, the vending mechanism 68 is provided with an indexing conveyor 132 of which the carriers 112 actually form a part. As shown to advantage in Figs. 5, 8, 9, and 10a, the conveyor 132 includes a pair of spaced endless tension elements in the form of roller chains 134 looped in vertical flights over upper and lower sprockets 136 and 138. The two chains 134 are in parallel, opposed, horizontally spaced relation. The upper and lower sprockets 136 and 138 for the front and rear chains are rotatably mounted on the front and rear frame uprights 74 and 76. It will be seen from Fig. 9 that the lower sprockets 138 are mounted on opposite ends of a shaft 140. A drive chain 142 is utilized to connect the shaft 140 to a shaft 144 which extends into a speed reduction motor 146. One of the horizontal frame members 78 may be employed to support the motor 146.

In order that the carton carriers 112 may be suspended on the conveyor 132, a plurality of rods 148 are mounted between the front and rear chains 134 at spaced points along the chains. As shown to advantage in Figs. 10a and 13, each rod 148 has its opposite ends connected to a pair of arms 150. Each arm 150 is mounted on a special link of one of the chains 134.

Figure 13:
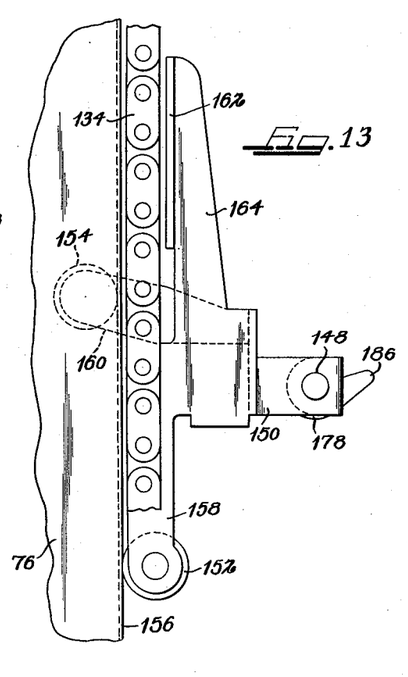
Fig. 13 is a fragmentary enlarged rear view showing details of the indexing conveyor for advancing the carton carriers, the view being taken generally as indicated by the line 13—13 in Fig. 9.

To prevent the rods 148 and the rod supporting arms 150 from sagging and from kinking the chains 134 as the carton carriers 112 approach the delivery position 130, each of the arms 150 is fitted with a pair of guide rollers 152 and 154 which are adapted to engage a vertical guide flange or rail 156. Such rails 156 are mounted on both the front and rear frame uprights 74 and 76 along the downward path of the carton carriers 112 as they approach the delivery position. It will be seen that the roller 152 is mounted on a depending arm 158 which is integral with the arm 150, while the roller 154 is mounted on an upwardly and laterally extending integral arm 160. The rollers 152 and 154 respectively roll along the outer and inner sides of the flange 156. It will be understood that the arrangement of the rollers 152 and 154 is such that the arm 150 is maintained in a horizontal position, with the result that the weight of the carton carriers does not cause any kinking of the chain. Likewise, the carton carrier supporting rods 148 are guided in vertical paths.

On the flights of the chains 134 opposite from the delivery position 130, the arms 158 and 160 are in inverted position relative to that shown in Fig. 13. To prevent the weight of the carton carriers from unduly kinking the chains 134, each arm 150 is formed with a shoe in the form of a flange 162 mounted on a vertical arm 164 which extends in a direction opposite from that of the arm 158. It will be understood that the shoes 162 are adapted to engage the chains 134 at points below the arms 150 as the carton carriers 112 are moved upwardly along the flights of the chains opposite from the delivery position 130. The leverage afforded by the shoe 162 and its supporting arm 164 prevents undue kinking of the chains.

Figure 9:
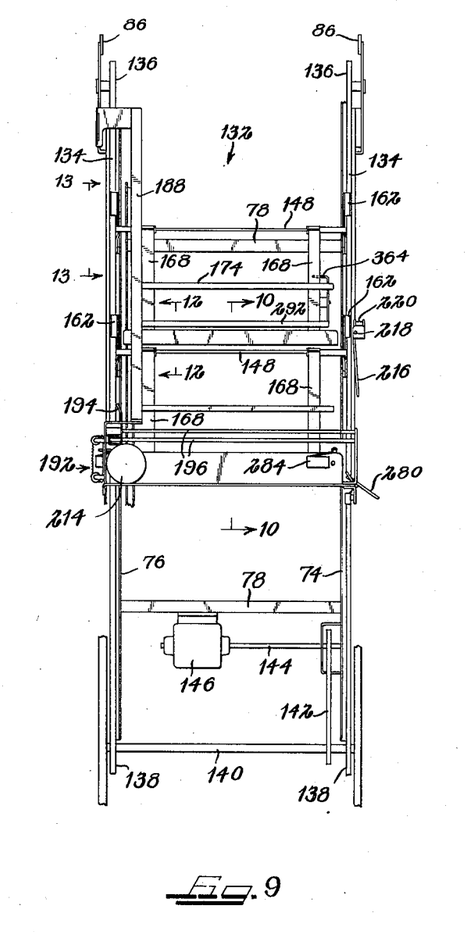
Fig. 9 is a side elevational view of the vending mechanism.
Figure 10A:
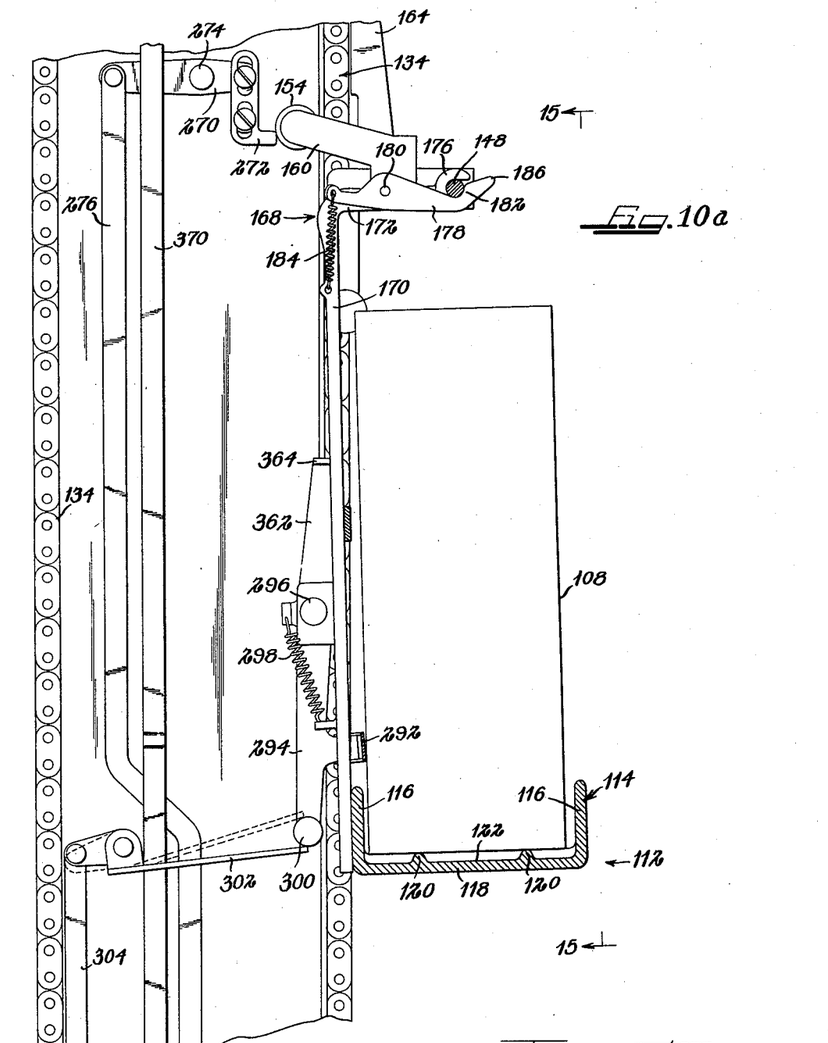
Fig. 10a is a fragmentary elevational sectional view taken through one of the carton carriers embodied in the machine, generally along a line 10—10 in Fig. 9.
Figure 15:
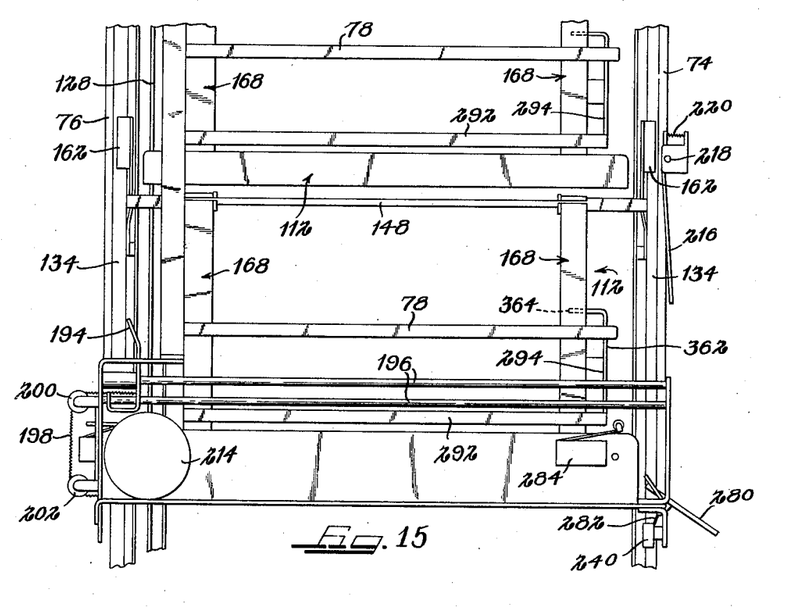
Figure 16:
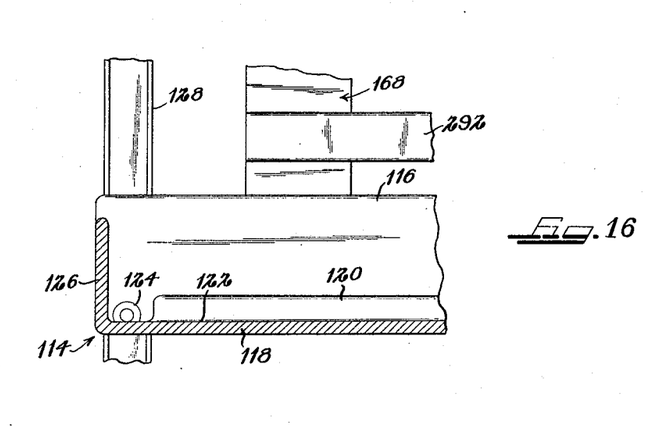
Fig. 16 is a fragmentary elevational sectional view taken through one of the carton carriers, generally along a line 16—16 in Fig. 12.

To suspend the channel-shaped members 114 from the conveyor rods 148, the carton carriers 112 are provided with pairs of hanger arms 168, as shown to advantage in Figs. 9, 10a, and 15. It will be seen that the hanger arms 168 are generally of inverted L-shaped form and are provided with elongated depending arms 170 which join at their upper ends with generally horizontal arms 172 extending into overlying relation to the channel-shaped member 114. At their lower ends, the depending arms 170 are secured to one side wall 116 of the channel 114. Thus, the depending arms 170 serve not only to suspend the channel 114 but also to stabilize the cartons 108. On each of the carton carriers 112 a horizontal rail 174 extends between the depending arms 170, to prevent the cartons from tipping and to guide them in their sliding movement along the channels 114 at the delivery position, as will be explained in greater detail below.

To mount the hanger arms 168 on the conveyor rods 148, a hook 176 is formed on the end of each of the horizontal arm portions 172. The hook 176 is disengageably retained on the rod 148 by means of a swingable locking arm 178 mounted on the horizontal arm portion 172 by means of a pivot 180. An upwardly opening hook portion 182 is formed on the outer end of the arm 178 for engaging the lower side of the rod 148 and thereby maintaining the hook 176 in engagement with the upper side of the rod. A spring 184 is provided to bias the locking arm 178 against the rod 148. The locking arm 178 may be released from the rod 148 by pushing down on a manually engageable finger piece 186 projecting outwardly beyond the hook portion 182.

The indexing conveyor 132 is provided with a control arrangement, to be explained in detail below, such that each successive carton carrier 112 is moved downwardly in turn to the delivery position 130. As each carton carrier 112 moves into the delivery position, it is guided and positioned laterally by means of outer and inner side rails 188 and 190 (Fig. 5).

At the delivery station 130, a delivery conveyor 192, shown to advantage in Figs. 8, 9, 11, and 15, advances the row of cartons 108 or other articles along the carton carrier 112 so that each carton in turn will be ejected from the front end of the carton carrier. It will be understood that the operation of the delivery conveyor 192 is controlled by the depositing of a proper coin or coins in the coin opening 42, as will be explained in detail below.

Figure 11:
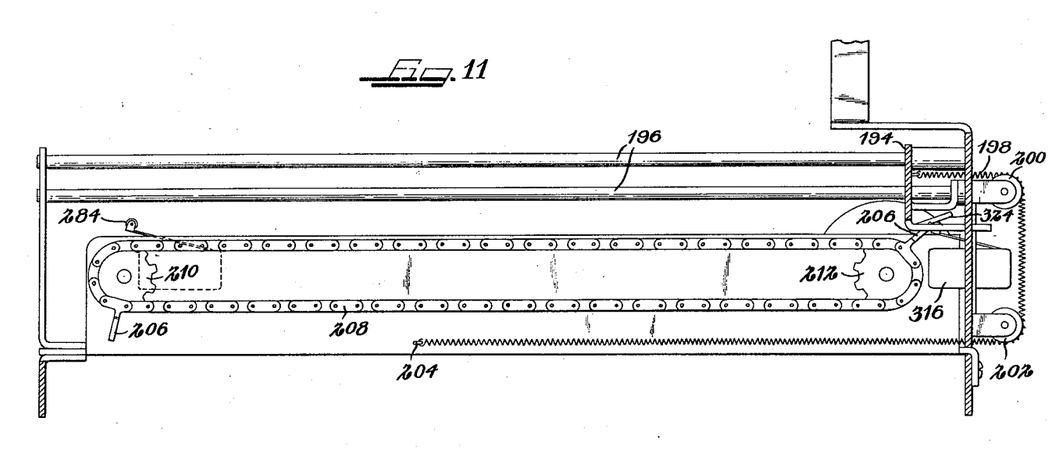
Fig. 11 is a fragmentary elevational sectional view showing the delivery conveyor for pushing cartons off the carton carrier at the delivery position, the view being taken generally along a line 11—11 in Fig. 8.

In order to move the row of cartons 108 along the carton carrier 112 at the delivery position, the delivery conveyor 192 is equipped with a pusher in the form of a paddle 194 which is engageable with the rearmost carton 108 on the carrier 112. The pusher 194 is slidably mounted for forward and rearward movement on a pair of guide rods 196. In this instance, the pusher 194 is biased toward its rearmost position by means of an elongated coiled tension spring 198 which is strung over pulleys 200 and 202 and then extends forwardly under the path of movement of the pusher to an anchoring element 204.

The pusher 194 is adapted to be engaged and moved forwardly along the rods 196 by means of a plurality of arms 206 which in this instance are carried by an endless chain 208. It will be seen that the chain 208 is threaded around front and rear sprockets 210 and 212 and is arranged with its flights extending in a horizontal direction and spaced apart vertically. The flights of the chain 208 are parallel to the pusher guide rods 196 so that each of the arms 206 will carry the pusher 194 forwardly as the chain is advanced. The chain is adapted to be advanced by a delivery conveyor motor 214 connected to the rear sprocket 212.

When the chain 208 is advanced, each of the arms 206 engages the pusher 194 in turn and carries the pusher forwardly against the biasing action of the spring 198. When the arm 206 moves downwardly around the front sprocket 210, the arm is withdrawn from the pusher 194, with the result that the pusher is released for rearward movement under the impetus of the return spring 198.

As the cartons 108 in the carton carrier 112 at the delivery position 130 are pushed forwardly by the delivery conveyor 192, the foremost carton in the carrier 112 will fall into the delivery chute 56 through the entrance opening 66 in the inner cover 52 of the cabinet 36. This will be clearly evident from Fig. 5. In order to insure that the carton 108 will fall with its lower end foremost into the delivery chute 56, a spring biased swingable paddle 216 is mounted on the front upright 74 of the frame 72 so as to engage the top of the foremost carton 108 and thereby prevent the carton from toppling into the delivery chute 56, which might cause jamming of the carton in the chute. The paddle 216 is swingable forwardly on a pivot 218 and is biased rearwardly by a spring 220 (Figs. 9 and 15). As the foremost carton is shoved toward the front end of the carton carrier 112, the top front portion of the carton engages the paddle 216, with the result that the carton will be maintained in a generally upright position until the bottom of the carton drops off the front end of the carton carrier 112.

Turning to the control mechanism for the vending machine, the operation of the delivery conveyor 192 is initiated by depositing a suitable coin or coins in the coin opening 42. The coin moves a single-pole double-throw switch 222 (Fig. 2) from its full line to its dotted line position. In its dotted line position, the coin switch 222 connects a relay winding 224 across a pair of power line wires 226 and 228. The winding 224 is part of a locking relay 230 which includes a movable contact 232 engageable with either of a pair of fixed contacts 234 and 236. Energization of the winding 224 shifts the movable contact 232 from the contact 234 to the contact 236 and thereby completes a holding circuit for the relay winding 224. It will be seen that the holding circuit includes a lead 238, a delivery switch 240, a lead 242, the contacts 232 and 236, and a lead 244, all arranged in series between the power line 226 and the winding 224 so as to bypass the coin switch 222.

Figure 2:
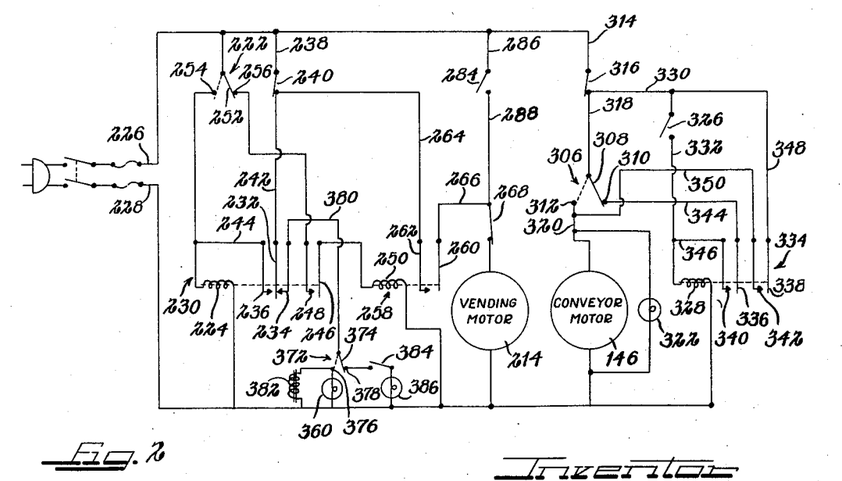
Fig. 2 is a schematic diagram showing the electrical circuit of the vending machine of Fig. 1.

Energization of the relay winding 224 in response to the operation of the coin switch 222 also moves a movable contact 246 into engagement with a fixed contact 248. This has the effect of energizing a second relay winding 250, as soon as the coin has dropped off the switch 222. It will be seen that the coin switch 222 comprises a movable contact 252 and a pair of fixed contacts 254 and 256. In its dotted line position, the movable contact 252 engages the fixed contact 254 which is connected to the holding relay winding 224. The other fixed contact 256 is connected through the contacts 248 and 246 to the second relay winding 250. It will be evident that closure of the contacts 246 and 248 and return of the coin switch 222 to its full line position will connect the relay winding 250 across the power line wires 226 and 228.

The relay winding 250 is part of a vending motor relay 258, which also includes a movable contact 260 and a fixed contact 262. Energization of the relay 258 closes the contacts 260 and 262 and thereby establishes an energizing circuit for the vending motor 214. It will be seen that this energizing circuit includes the lead 238, the delivery switch 240, a lead 264, the contacts 260 and 262, a lead 266, and a safety switch 268, all connected in series between the power line wire 226 and the vending motor. The other side of the vending motor is connected to the power line wire 228.

The safety switch 268 is closed when one of the carton carriers 112 is properly positioned at the delivery station 130. As shown to advantage in Fig. 10a, the safety switch 268 is operable by a bell crank lever 270 having an adjustable arm 272 adapted to be engaged by one of the rollers 154 on the indexing conveyor 132. It will be recalled that the roller 154 is in a fixed vertical relation to the associated rod 148 and hence is in a fixed vertically spaced relation to the carton carrier 112 suspended on the rod 148. The bell crank lever 270 is swingable about a pivot 274 and is connected to the safety switch 268 by means of a vertical link 276.

As the carton carrier 112 moves into the delivery position 130, the roller 154 engages the arm 272 and thereby swings the bell crank lever 270 in a clockwise direction so as to close the safety switch 268 and condition the vending motor for energization by the relay 258.

When a suitable coin or coins are dropped into the coin opening 42, the relays 230 and 258 are energized, with the result that the vending motor 214 starts to operate. It will be recalled that the vending motor 214 advances the chain 208 so that one of the arms 206 will engage and advance the pusher 194. Forward movement of the row of cartons in the carton carrier 112 results from the movement of the pusher 194. When the foremost carton in the row drops off the front end of the carton carrier 112 into the delivery chute 46, it trips a delivery lever 280, shown to advantage in Figs. 5, 9, and 15. The delivery lever 280 is swingable downwardly but is biased upwardly by means of a spring 282. Downward movement of the delivery lever 280, caused by the falling carton, opens the delivery switch 240, which is operable by the lever 280. The opening of the switch 240 immediately stops the vending motor 214, because the switch 240 is in series with the energizing circuit for the vending motor. Moreover, the opening of the delivery switch 240 releases the holding relay 230, because the switch 240 is in series with the holding circuit for the relay. The release of the relay 230 results in the release of the relay 258, inasmuch as the normally open contacts 246 and 248 of the relay 230 are in the energizing circuit for the relay winding 250.

It will be apparent that each successive carton in the carton carrier 112 is delivered by the depositing of a suitable coin or coins in the coin opening 42. The arrangement of the second relay 258 prevents a carton from being delivered if a coin should become jammed on the coin switch 222. Such jamming might otherwise result in repeated operation of the machine, commonly known as "jack-potting."

After the last carton 108 has been ejected from the carton carrier 112 at the delivery position 130, the vending motor 214 is kept in operation to insure that the arm 206 on the chain will be withdrawn from the pusher 194 so that the pusher can be retracted by the spring 198. To this end, the pusher is arranged to engage and operate an overriding switch 284. It will be seen from Fig. 2 that the overriding switch 284 is connected in an alternate energizing circuit for the vending motor 214. Such alternate energizing circuit includes a lead 286, the overriding switch 284, a lead 288, and the safety switch 268, all connected in series between the line wire 226 and the vending motor 214. It will be evident that the alternate energizing circuit, controlled by the overriding switch 284, serves as a bypass around the relay contacts 260 and 262. The pusher 194 engages the overriding switch 284 adjacent the forward limit of travel of the pusher so as to maintain the vending motor 214 in operation despite the opening of the delivery switch 240. Once the arm 206 has been withdrawn from the pusher 194, the spring 198 returns the pusher to its rearmost position. The overriding switch 284 is thereby opened so as to stop the vending motor.

Provision is made for initiating the operation of the indexing conveyor 132 after the last carton 108 has been discharged from the carton carrier 112 at the delivery position 130. To this end, each carton carrier 112 is equipped with means to indicate whether one or more cartons remain in the carton carrier. In the illustrated construction, such means include a bail rod 292 mounted on a pair of depending arms 294. Pivots 296 are provided to connect the arms 294 to the carton carrier 112. It will be observed that the bail rod 292 extends along the entire length of the carton carrier 112 and is movable inwardly into the space normally occupied by the cartons 108 in the carton carrier 112. However, when one or more cartons are present in the carton carrier 112, the bail rod 292 and the arms 294 are held outwardly with the bail rod 292 engaging the cartons above the channel member 114. A spring 298 is provided to bias the arms 294 inwardly so that the bail rod 292 will be maintained in engagement with the cartons.

One of the arms 294 is fitted with a roller 300 which is engageable with a switch operating lever 302, provided one or more cartons 108 are present in the carton carrier 112 so that the arms 294 are swung outwardly. When the carton carrier 112 is indexed to the delivery position, the roller 300 engages the lever 302 and swings it clockwise. After the last carton 108 has been discharged from the carton carrier 112 by the delivery conveyor 192, the biasing spring 298 swings the arms 294 inwardly. Accordingly, the roller 300 is withdrawn from the lever 302, with the result that the lever swings upwardly into the dotted line position shown in Fig. 10a.

To control the operation of the indexing conveyor 132, the lever 302 is connected by a vertical link 304 to an indexing control switch 306 (Fig. 2). Movement of the lever 302 to its dotted line position also moves the switch 306 to the dotted line position in Fig. 2. It will be seen that the switch 306 comprises a movable contact 308 and a pair of fixed contacts 310 and 312. When the movable contact 308 is moved to its dotted line position, it engages the contact 312 and completes an energizing circuit for the indexing conveyor motor 146. Such energizing circuit includes a lead 314, a safety switch 316, a lead 318, the contacts 308 and 312, and a lead 320, all connected in series between the power line wire 226 and one side of the conveyor motor 146. The other side of the conveyor motor is connected to the other power line wire 228. A signal lamp 322 is connected across the conveyor motor 146 to indicate to the customer that there will be a slight delay in the delivery of the next carton. Such signal lamp 322 may be employed to illuminate a sign with the legend, "One Moment, Please," for example.

It will be recalled that the operation of the indexing motor 146 is initiated when the roller 300 on the empty carton carrier 112 moves away from the lever 302 and permits it to move upwardly into its dotted line position. When the next carton carrier 112, loaded with cartons 108, arrives at the delivery position, the roller 300 swings the lever 302 downwardly and thereby moves the switch 306 to its full line position. In this position, the energizing circuit for the indexing conveyor motor 146 is broken.

The safety switch 316 is provided in order that the indexing conveyor motor 146 will not be energized until the pusher 194 has returned to its rearmost position, out of the way of the next carton carrier 112. As shown in Fig. 11, the safety switch 316 is mounted adjacent the rearmost position of the pusher 194 and is adapted to be engaged by a shoe or cam 324 mounted on the pusher.

While the indexing conveyor is in motion, the vending conveyor 192 is prevented from operating because the safety switch 268 is open. This is true because none of the rollers 154 is in engagement with the bell crank lever 270 which operates the safety switch 268.

The machine is arranged so that the indexing conveyor may be advanced under manual control while the machine is being loaded with bottles. To this end, the machine is provided with a manually operable loading switch 326. Closure of the switch 326 establishes an energizing circuit for a relay winding 328. Such energizing circuit includes the lead 314, the safety switch 316, a lead 330, the loading switch 326, and a lead 332, all connected in series between the power line wire 226 and one side of the relay winding 328, the other side of the relay winding being connected to the power line wire 228. It will be observed that the relay winding 328 forms a part of a loading relay 334 which also includes movable contacts 336 and 338, together with associated fixed contacts 340 and 342. With the winding 328 energized, the movable contact 336 engages the fixed contact 340 and thereby completes a holding circuit for the winding 328. Such holding circuit bypasses the loading switch 326 and includes the lead 314, the safety switch 316, the lead 318, the movable contact 308 of the conveyor control switch 306, the fixed contact 310, a wire lead 344, the contacts 336 and 340, and a lead 346, all connected in series between the power line wire 226 and the winding 328.

Energization of the winding 328 engages the movable contact 338 with the fixed contact 342 and thereby establishes an alternate energizing circuit for the indexing conveyor motor 146. Such alternate circuit bypasses the control switch 306 and includes the lead 314, the safety switch 316, a lead 348, the contacts 338 and 342, and a lead 350, all connected in series between the line wire 226 and the conveyor motor 146.

If the loading switch 326 is closed momentarily and then opened, the relay 328 will be energized and will remain energized, after the opening of the switch 326, by virtue of the holding contacts 336 and 340. During the initial movement of the indexing conveyor 132, the roller 300 on the carton holder 112 at the delivery position will pass the lever 302, whereupon the lever will swing upwardly to shift the conveyor control switch 306 to its dotted line position. This will break the holding circuit for the relay winding 328, with the result that the motor operating contacts 338 and 342 will be opened. However, the motor 146 will continue to run since it is being energized by the control switch 306. When the next full carton carrier 112 arrives at the delivery station, the conveyor motor 146 will be stopped by the movement of the switch 306 to its full line position.

It will be apparent that continued closure of the loading switch 326 will maintain the conveyor motor 146 in operation regardless of the position of the conveyor control switch 306. With the loading switch 326 closed, the relay 334 is continuously energized, and the contacts 338 and 342 bypass the contacts 308 and 312 of the switch 306.

The machine is arranged to stop automatically and light up an empty signal lamp 360 when the last carton 108 in the machine has been delivered. It will be recalled that the delivery of the last carton 108 from the carton carrier 112 at the delivery position permits the spring pressed bail rod 292 to swing inwardly. The roller 300, carried by the bail rod arm 294, is thereby disengaged from the conveyor control lever 302 so as to permit the lever 302 to swing upwardly and start the conveyor motor 146. More specifically, the upward movement of the lever 302 shifts the conveyor control switch 306 to its dotted line position (Fig. 2) so as to energize the motor 146.

Figure 10B:
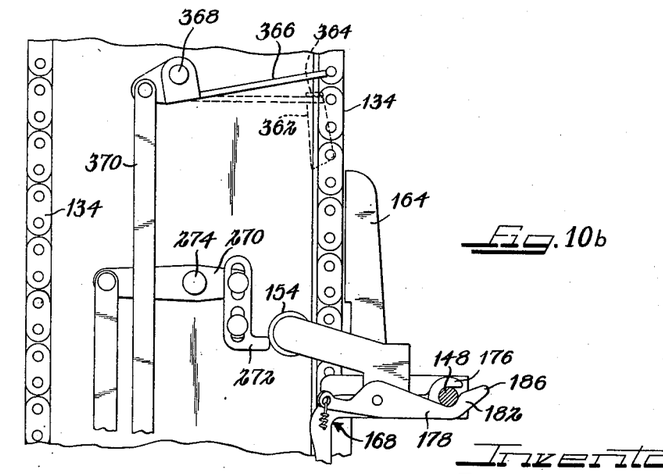

As the conveyor motor 146 advances the empty conveyor 132, the carton carrier 112 immediately above the delivery position 130 is moved downwardly toward the delivery position. However, the conveyor 132 is stopped before this carton carrier 112 reaches the delivery position. To this end, one of the bail rod levers 294 on each of the carton carriers 112 is provided with an additional control element in the form of an upwardly projecting arm 362 having a hook or lug 364 on its upper end. When the carton carrier 112 is empty, the lug 364 is swung outwardly into such a position that it will engage a switch operating lever 366 as the carton carrier descends toward the delivery position 130. It will be seen from Fig. 10b that the switch operating lever 366 is mounted on the front upright 74 of the frame, somewhat above the position of the bell crank lever 270. A pivot 368 provides a pivotal support for the lever 366. By means of a depending link 370, the lever 366 is operatively connected to an empty switch 372 (Fig. 2). At the same time, the link 370 connects the lever 366 to the conveyor control switch 306. When the hook 364 on the downwardly indexing carton carrier 112 swings the lever 366 downwardly, the link 370 shifts the conveyor switch 306 to its full line position shown in Fig. 2 so as to de-energize the conveyor motor 146 and thereby stop the indexing conveyor 132. Simultaneously, the link 370 shifts the empty switch 372 to its dotted line position (Fig. 2). It will be seen that the empty switch 372 comprises a movable contact 374 which is selectively engageable with fixed contacts 376 and 378. When the empty switch 372 is in its dotted line position, the movable contact 374 engages the fixed contact 376 and thereby completes an energizing circuit for the empty lamp 360. Such energizing circuit extends from the line wire 226 through the lead 238, the delivery switch 240, the lead 242, the holding relay contacts 232 and 234, a lead 380, and the contacts 374 and 376 to one side of the lamp 360, the other side of the lamp being connected to the opposite line wire 228.

The coin chute 42 is provided with a disabling solenoid 382 which is connected in parallel with the empty lamp 360 and hence is energized when the empty switch 372 is operated to its dotted line position by the empty carton carrier 112. In any known or suitable manner, the energization of the solenoid 382 results in the immediate bypassing of any deposited coin from the coin chute 42 to the coin return opening 48. Thus, when the machine is empty, any coin which may be deposited is immediately returned and is ineffective to operate the coin switch 222.

In passing, it may be noted that the fixed contact 378 of the empty switch 372 is connected through a switch 384 to a signal lamp 386. The switch 384 is embodied in the change making mechanism 60 and is arranged so that the switch will be closed if the change making mechanism is empty. The illumination of the lamp 386 thus indicates that the supply of change is exhausted and that only coins amounting to the correct total cost of the milk bottle should be inserted. For example, where the cost of a carton of milk is twenty cents and the machine is arranged to accept either quarters or nickels, the lighting of the lamp 386 indicates to the purchaser that only nickels should be deposited.

In summary, it may be helpful to review briefly the operation of the machine. To purchase one of the milk cartons 108, the customer simply deposits the correct coin or combination of coins in the coin chute 42. The deposition of the coin or coins shifts the coin switch 222 (Fig. 2) to its dotted line position and thereby energizes the holding relay 230. After the coin drops off the switch 222 and permits it to return to its full line position, the holding contacts 232 and 236 maintain the energization of the relay 230. The antijack-potting relay 258 is energized through the relay contacts 246 and 248 when the coin switch 222 returns to its full line position. Thus, both of the relays 230 and 258 must be energized to initiate operation of the machine. The energization of the antijack-potting relay 258 closes the contacts 260 and 262 and thereby starts the vending motor 214.

Operation of the vending motor 214 advances the vending conveyor chain 208. One of the arms 206, carried by the chain 208, engages the pusher 194 and advances it along the conveyor basket or carton carrier 112 at the delivery position 130. As a result of the movement of the pusher, the entire row of cartons 108 in the carton carrier 112 is pushed forwardly until the foremost carton 108 drops off the front of the carton carrier into the delivery chute 56. The falling carton trips the delivery lever 280 and thereby opens the delivery switch 240 (Fig. 2). As a result, the energizing circuit for the vending motor 214 is broken and the vending motor stops. At the same time, the circuit through the holding contacts 232 and 236 is opened so that the relays 230 and 250 are de-energized. Thus, the momentary opening of the delivery switch 240, caused by the falling carton 108, is sufficient to prevent another carton from being delivered until another coin is deposited in the machine.

When the last carton 108 has been delivered from the carton carrier 112 at the delivery position 130, the falling carton trips the delivery switch 240, as already described, and breaks the normal energizing circuit for the vending motor 214. However, the vending motor is kept in operation for a sufficient time to insure the return of the pusher 194. Such continued operation of the vending motor 214 is brought about by the override switch 284 which is closed by the pusher 194 as it approaches its point of farthest advance. The closure of the override switch establishes an alternate energizing circuit for the vending motor 214. As a result, the vending conveyor chain 208 is advanced until the arm 206 passes downwardly around the sprocket 210 and is withdrawn from the pusher 194. The spring 198 thereupon returns the pusher 194 to its rearmost position. It will be understood that the return of the pusher 194 results in the opening of the override switch 284 and the consequent stopping of the vending motor 214.

Figure 8:
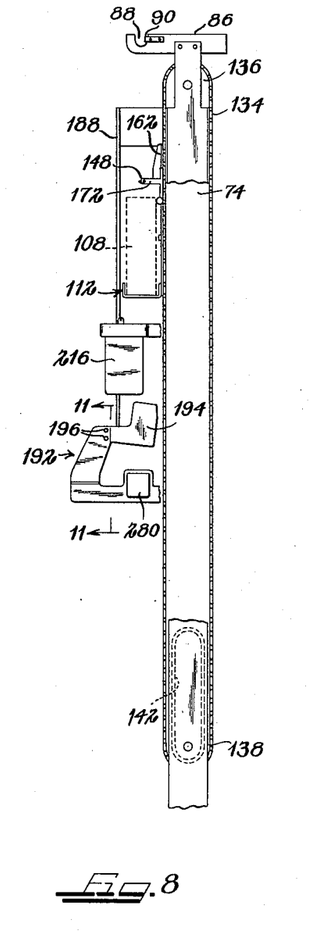
Fig. 8 is a front elevational view of the vending mechanism embodied in the machine of Fig. 1.

After the last carton 108 has been delivered from the carton carrier 112 at the delivery position, and after the pusher 194 has been returned to its rearmost position, the indexing conveyor 132 is automatically started to advance the next fully loaded carton carrier 112 to the delivery position. The delivery of the last carton 108 from the conveyor basket 112 permits the bail road 292 (Fig. 10a) to swing inwardly into the space formerly occupied by the cartons. As a result, the roller 300 on the bail rod lever 294 is withdrawn from the switch operating lever 302, whereupon the lever 302 swings upwardly. This moves the indexing switch 306 to its dotted line position (Fig. 2). In its rearmost position, the pusher 194 closes the safety switch 316 (Figs. 2 and 11). Both the operation of the indexing switch 306 and the closure of the safety switch 316 are necessary to energize the indexing conveyor motor 146. Once the motor 146 has been started, it drives the indexing conveyor chain 134 in a counterclockwise direction, as seen in Fig. 8. Accordingly, the carton carrier 112 immediately above the delivery position 130 is lowered toward the delivery position. When this fully loaded carton carrier 112 reaches the delivery position, the roller 300 (Fig. 10a) swings the switch operating lever 302 downwardly and thereby moves the indexing switch 306 to its full line position (Fig. 2). The energizing circuit for the conveyor motor 146 is thereby broken and the indexing conveyor 132 accordingly stops with the loaded carton carrier 112 at the delivery position. The guide roller 154 swings the bell crank lever 270 in a clockwise direction and thereby closes the safety switch 268 for the vending motor 214. It will be apparent that the safety switch 268 prevents the vending motor from advancing the pusher 194 until the conveyor basket 112 is properly positioned, even if a coin is deposited in the machine while the conveyor 132 is indexing.

After the last bottle has been delivered from the machine, the conveyor 132 will index only until the empty switch lever 366 (Fig. 10b) is engaged by the lug 364 on the carton carrier 112 immediately above the delivery position 130. When this carton carrier is empty, the lug 364 on the bail rod lever 294 is swung outwardly so that it will engage the empty switch lever 366 as the carton carrier moves downwardly toward the delivery position. The operation of the lever 366 operates the conveyor switch 306 so as to de-energize the conveyor motor 146. At the same time, the lever 366 operates the empty switch 372 so as to energize the empty light 360 and the solenoid 382. The latter disables the coin chute 42 so that any subsequently deposited coin will simply fall through the coin chute into the return opening 48, without operating the coin switch 222.

When the machine is to be loaded or serviced the outer and inner doors 38 and 52 are swung open. The lower and upper rail extensions 92 and 104 may then be mounted on the rails 80 and 84, whereupon the empty vending mechanism 68 may be rolled out of the cabinet 36 on the rollers 82. This greatly facilitates maintenance, cleaning, and loading of the machine.

For loading, the conveyor 132 may be indexed by operating the loading switch 326. This switch energizes the relay 328 and thereby bypasses the indexing control switch 306.

It will be apparent that a large supply of cartons may be held in the various carton carriers suspended at spaced intervals around the indexing conveyor 132. Nevertheless, the large supply of cartons is under perfect control at all times. Each carton is positively dispensed in turn under such conditions of control that it cannot become jammed in the machine. Thus, each carton carrier is advanced independently of the others to the delivery position. At the delivery position, the channel-shaped carton supporting members on the carton carriers guide the cartons in their forward procession toward the delivery chute.

The channel-shaped carton supporting members serve not only to guide the cartons as they are dispensed, but also to carry off any spilled contents of the cartons to the spouts and the drain channels.

It will be evident that the machine may be adjusted to handle a wide variety of articles, in addition to various kinds of cartons.

Various other modifications, alternative constructions and equivalents may be employed without departing from the true spirit and scope of the invention as exemplified in the foregoing description and defined in the following claims.

I claim:

1. A machine for vending cartons or other articles, said machine comprising a plurality of elongated trays for receiving respective rows of the cartons, an indexing conveyor including a pair of vertically extending horizontally spaced parallel conveyor chains, means for suspending said trays between said chains at spaced points therealong, an indexing conveyor motor for advancing said chains to move the trays successively to a delivery position, a delivery conveyor at said delivery position and including a pusher for advancing the row of cartons along the tray at the delivery position and thereby ejecting the successive cartons in the row from the tray, a delivery motor for advancing said pusher, coin operated means for starting said delivery motor, means responsive to ejection of each successive carton from the tray at the delivery position for stopping the delivery motor, means for returning said pusher to its initial position after the ejection of the last carton from the tray at the delivery position, means responsive to absence of cartons at the delivery position for starting the indexing motor, means responsive to the arrival of the next successive tray containing cartons at the delivery position for stopping the indexing motor, and means responsive to the movement of an empty tray toward the delivery position for stopping the indexing motor.

2. A machine for vending cartons or other articles, said machine comprising a plurality of elongated trays for receiving respective rows of the cartons, an indexing conveyor including a pair of spaced parallel conveyor chains, means for mounting said trays between said chains at spaced points therealong, an indexing conveyor motor for advancing said chains to move the trays successively to a delivery position, a delivery conveyor at said delivery position and including a pusher for advancing the row of cartons along the tray at the delivery position and thereby ejecting the successive cartons in the row from the tray, a delivery motor for advancing said pusher, coin operated means for starting said delivery motor, means for stopping the delivery motor after the ejection of each successive carton, means responsive to absence of cartons at the delivery position for starting the indexing motor, and means responsive to the arrival of each successive carton carrying tray at the delivery position for stopping the indexing motor.

3. In a vending machine for vending cartons or other articles, the combination comprising a plurality of elongated members for supporting respective rows of the cartons, an indexing conveyor for successively moving said members to a delivery position, a delivery conveyor at said delivery position and including a pusher for engaging the rearmost carton in the row at the delivery position and advancing said row of cartons forwardly to eject the foremost carton from the elongated member, means supporting said pusher for forward and rearward movement above the member at the delivery position, an endless chain having a plurality of fingers spaced therealong for engaging and advancing said pusher, front and rear sprockets disposed adjacent the front and rear ends of the member at the delivery position for supporting said chain, said fingers in moving around said front sprocket being withdrawn from said pusher, yieldable means biasing said pusher rearwardly for returning said pusher when it is released by each successive finger, a delivery motor for driving said chain and thereby advancing said pusher, coin operated means for starting said delivery motor, means responsive to ejection of each successive carton from the front end of said member for stopping said delivery motor, means engageable by said pusher adjacent the front end of the member at the delivery position for continuing operation of said delivery motor after the last carton has been ejected from said member, means responsive to absence of cartons in the member at the delivery position for conditioning said indexing conveyor for initiation of operation, and means operable by return of said pusher to its initial position for initiating operation of said indexing conveyor.

4. In a vending machine for vending cartons or other articles, the combination comprising a plurality of elongated members for supporting respective rows of the cartons, an indexing conveyor for successively moving said members to a delivery position, a delivery conveyor at said delivery position and including a pusher for engaging the rearmost carton in the row at the delivery position and advancing said row of cartons forwardly to eject the foremost carton from the elongated member, means supporting said pusher for forward and rearward movement above the member at the delivery position, an endless chain having a plurality of fingers spaced therealong for engaging and advancing said pusher, front and rear sprockets disposed adjacent the front and rear ends of the member at the delivery position for supporting said chain, said fingers in moving around said front sprocket being withdrawn from said pusher, yieldable means biasing said pusher rearwardly for returning said pusher when it is released by each successive finger, a delivery motor for driving said chain and thereby advancing said pusher, and coin operated means for controlling said delivery motor.

5. In a machine for vending cartons or other articles, the combination comprising a plurality of elongated baskets for carrying respective rows of the cartons, an indexing conveyor for successively moving said baskets along a predetermined vertical path to a delivery position, a delivery conveyor for pushing the row of cartons along the basket at the delivery position and thereby ejecting the successive cartons in the row from the basket, a bail rod swingably mounted on each basket for engaging the cartons therein, means biasing said bail rod inwardly against the cartons so that said bail rod will swing inwardly when the basket is empty and will be held outwardly when one or more cartons are in the basket, a control element adjacent said delivery position for stopping said indexing conveyor, an actuating member connected to said bail rod and engageable with said control element when said bail rod is swung outwardly for stopping said indexing conveyor and thereby positioning the basket at the delivery position, said actuating member being withdrawn from said control element when said basket has been emptied of cartons and thereby being effective to initiate operation of said indexing conveyor, an empty stop control element along said path of said baskets at a point reached by said baskets before they reach said delivery position for terminating operation of said indexing conveyor, and an additional actuating element connected to said bail rod and engageable with said empty stop control element with said bail rod swung inwardly to stop the indexing conveyor when an empty basket approaches the delivery position.

6. In a machine for vending cartons or other articles, the combination comprising a plurality of elongated baskets for carrying respective rows of the cartons, an indexing conveyor for successively moving said baskets along a predetermined vertical path to a delivery position, a delivery conveyor for pushing the row of cartons along the basket at the delivery position and thereby ejecting the successive cartons in the row from the basket, a bail rod swingably mounted on each basket for engaging the cartons therein, means biasing said bail rod inwardly against the cartons so that said bail rod will swing inwardly when the basket is empty and will be held outwardly when one or more cartons are in the basket, a control element adjacent said delivery position for stopping said indexing conveyor, and an actuating member connected to said bail rod engageable with said control element for stopping said indexing conveyor and thereby positioning the basket at the delivery position, said actuating member being withdrawn from said control element when said basket has been emptied of cartons and thereby being effective to initiate operation of said indexing conveyor.

7. In a machine for vending cartons or other articles, the combination comprising a plurality of baskets having elongated generally channel-shaped trays thereon for supporting rows of the cartons, an indexing conveyor including a pair of vertically extending horizontally spaced parallel endless chains, a plurality of horizontal rods extending between said chains, each of said baskets having a member extending upwardly from one side of said tray, means at the upper end of said member for detachably suspending each of said baskets from one of said rods, each of said chains having a pair of vertical flights, an indexing motor for driving said chains and thereby moving said baskets successively to a delivery position along one of said flights, a pair of guide rails extending along said one flight of each chain adjacent said delivery position, each of said rods having a pair of guide members fixed to its opposite ends, each of said guide members having a pair of rollers thereon for engaging opposite sides of one of said rails, each of said guide members also having a shoe thereon for engaging one of said chains along the flight thereof opposite from said one flight to minimize kinking of said chain due to the weight of the basket and its load of cartons, a delivery conveyor at said delivery position for sliding the row of cartons along the tray and thereby ejecting the successive cartons in the row, and inner and outer guide rails adjacent said delivery position for engaging opposite sides of said tray and thereby aligning said tray with said delivery conveyor.

References Cited in the file of this patent

UNITED STATES PATENTS

| | | | |
|---|---|---|---|
| Re. 23,103 | Newcomer | Apr. 26, | 1949 |
| 924,164 | Judelson | June 8, | 1909 |
| 1,281,923 | Fales | Oct. 15, | 1918 |
| 1,348,490 | Gill | Aug. 3, | 1920 |
| 1,724,196 | Harrison | Aug. 13, | 1929 |
| 1,864,064 | Hall | June 21, | 1932 |
| 2,140,242 | Miller et al. | Dec. 13, | 1938 |
| 2,314,632 | Rear | Mar. 23, | 1943 |
| 2,392,511 | Thompson | Jan. 8, | 1946 |
| 2,477,239 | Cease | July 26, | 1949 |
| 2,644,734 | Gabrielson | July 7, | 1953 |